J. S. BUTTERFIELD.
Harvester Reel Attachment.
No. 2,453. Reissued Jan. 15, 1867.
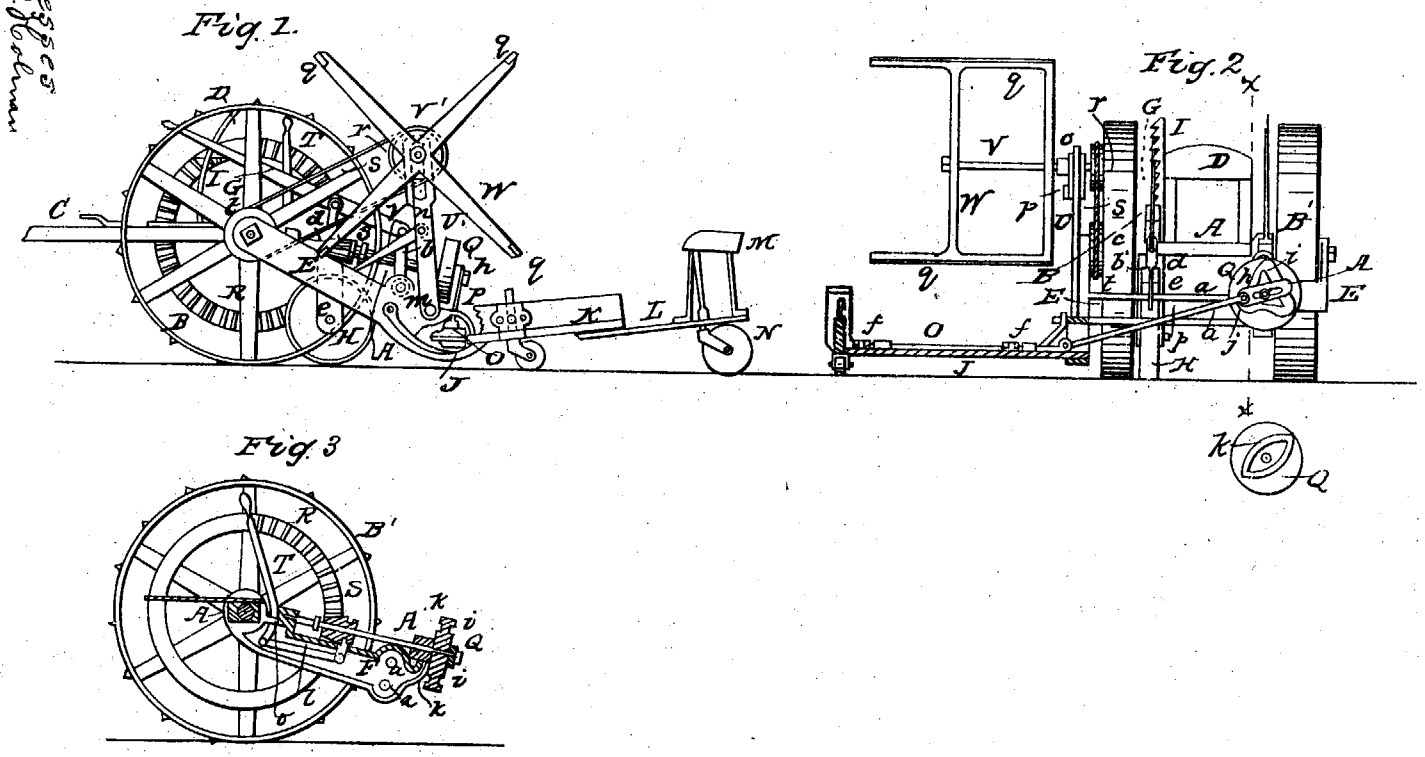
Witnesses
Andrew J. Holman
Jas. P. Wilkins
J. B. Butterfield
Inventor
J. S. Butterfield
N. PETERS, Photo-Lithographer, Washington, D. C.

UNITED STATES PATENT OFFICE.

ANDREW J. HOLMAN, OF PHILADELPHIA, PENNSYLVANIA, ASSIGNEE OF J. S. BUTTERFIELD.

IMPROVEMENT IN HARVESTERS.

Specification forming part of Letters Patent No. 19,483, dated March 2, 1858; Reissue No. 2,453, dated January 15, 1867.

DIVISION B.

*To all whom it may concern:*

Be it known that I, J. S. BUTTERFIELD, of the city of Philadelphia and State of Pennsylvania, have invented certain new and useful Improvements in Reaping and Mowing Machines; and I do hereby declare that the following is a full, clear, and exact description of that branch of my invention intended to be embraced in this application, reference being had to the annexed drawings, making a part of this specification, in which—

Figure 1 is a side view of a reaper with my improvements attached. Fig. 2 is a rear view of the same. Fig. 3 is a transverse vertical section of the same, taken in the line *x x*, Fig. 2. Fig. 4 is a detached view of one side of the cam which drives the sickle or cutters.

Similar letters of reference indicate like parts of the machine in all the figures.

The object of this branch of the invention is to produce a light, strong, and efficient reel, so arranged as to be easily and quickly adjusted to the varying character and condition of the crop to be operated upon; and the nature of the invention consists in mounting the shaft which carries the reel in a metallic journal-support, which is made adjustable upon, and is with the reel supported by, a single reel-post located at or near a line crossing the inner end of the cutting apparatus, at right angles thereto. What is meant by the inner end is that end of the cutting apparatus connected to the main frame. And it further consists in so arranging and supporting the post that it, with the reel thereon, can be leaned more toward or from the standing crop.

In machines having reels supported by posts at the opposite ends of its shaft, the outer one is liable to accumulate the cut, and tangle and pull down the standing grain or grass. When both supports are placed at the inner end they occupy considerable space on the main frame, and require a longer reel-shaft, and do not admit of as ready adjustment of the reel. Reels have been supported on a single post; but their vertical adjustability could only be obtained by moving both the post and the reel, no provision being made for lowering the reel without moving the post also.

In tangled and short grain the reel must be brought nearer the ground than in tall upright grain.

In tangled grain and in mowing grass it is not only desirable to place the reel lower, but it should be placed relatively to the cutters farther back. At times in mowing grass the reel may be dispensed with, in which case it should be easily removed.

To accomplish these objects I provide a post, U, which I attach to the bar E of the frame by a pivot, *m*. This bar has a support or brace, V, pivoted to it, as shown at *n*. The lower end of this brace is arranged to take into either of a series of notches in the bar E, and serves to sustain the post at a greater or less inclination, as desired. The upper end of the post U is slotted longitudinally for a short distance, and the metallic journal-box or support *o* is placed thereon, and secured at any desired point by the clamping-screw P. In this journal-box *o* is placed the inner end of the shaft V′, which is fitted as a journal to revolve therein. On that part of the shaft V′ which projects outward is firmly fixed the reel W. The beaters *q* of the reel are about equal in length to the cutting apparatus, while the shaft V′ is about half the length. (See Fig. 2.) On the inner end of the shaft V′ is fastened a pulley or sheave, *r*, and a belt, *b*, passes around said pulley, and also around a pulley, *t*, on the hubs of the wheel B, from which motion is imparted to the reel. By placing the sheave or pulley *r* on the shaft V′, on the opposite side of the post U from the reel, the tension of the band *b* in a measure counteracts the tendency of the reel to "droop" or "sag" at its outer end. This reel serves to bring the grass back to the cutters in mowing and the grain in reaping, and can be adjusted up and down upon the post, and the post with the reel thereon moved forward and back in the arc of a circle, of which the pivot-bolt *m* at the foot of the post is the center, the vertical adjustment of the reel being made without changing the post, and the post moved on its pivot without changing the position of the reel on the post.

The machine to which this reel is applied, as shown in the drawings, has two independent supporting-wheels, B B′, on a common axle, A, which carries, also, frame-pieces E E E, which carry a laterally-projecting cutting apparatus, supported by a finger-bar, J, and to which, in reaping, a platform, K, is connected. The cutters are operated, through mechanism connected by a train of gearing, with one of the supporting-wheels.

Having more fully described the machine under another and separate application and division bearing even date herewith, a more minute description in this case is deemed unnecessary.

It may be observed that this branch of the invention may be applied to other machines embracing other and different forms of construction.

Having described fully so much as relates to this branch of the invention, what I claim as new, and desire to secure by Letters Patent, is—

1. In combination with a reel supported on a single post, an adjustable mechanism by which the reel may be raised up or let down upon the post, substantially as described.

2. Supporting a reel on a single pivoted post, so arranged that it may be leaned more toward or from the standing grain or grass, in combination with an adjusting mechanism by which the reel can be raised up or let down upon the post, substantially as and for the purposes set forth.

J. S. BUTTERFIELD.

In presence of—
ANDREW J. HOLMAN,
J. B. BUTTERFIELD.